(12) United States Patent
Choi et al.

(10) Patent No.: US 8,916,632 B2
(45) Date of Patent: Dec. 23, 2014

(54) FLAME RETARDANT THERMOPLASTIC RESIN COMPOSITION AND MOLDED ARTICLE PRODUCED FROM THE SAME

(71) Applicant: Cheil Industries Inc., Gumi-si (KR)

(72) Inventors: Dong Kil Choi, Uiwang-si (KR); Su Hak Bae, Uiwang-si (KR); Jung Hun Lee, Uiwang-si (KR); Dong Min Park, Uiwang-si (KR); Seung Shik Shin, Uiwang-si (KR); Min Jung Joo, Uiwang-si (KR)

(73) Assignee: Cheil Industries Inc., Gumi-si (KR)

( * ) Notice: Subject to any disclaimer, the term of this patent is extended or adjusted under 35 U.S.C. 154(b) by 0 days.

(21) Appl. No.: 14/095,207

(22) Filed: Dec. 3, 2013

(65) Prior Publication Data

US 2014/0187690 A1 Jul. 3, 2014

(30) Foreign Application Priority Data

Dec. 28, 2012 (KR) ........................ 10-2012-0157672

(51) Int. Cl.
*C08L 1/00* (2006.01)
*C08L 69/00* (2006.01)

(52) U.S. Cl.
CPC ..................................... *C08L 69/00* (2013.01)
USPC ......................................... 524/127; 525/461

(58) Field of Classification Search
USPC ........................................................ 524/127
See application file for complete search history.

(56) References Cited

U.S. PATENT DOCUMENTS

| 7,544,745 B2 | 6/2009 | Ma et al. |
| 2003/0109650 A1* | 6/2003 | Campbell et al. ............. 525/461 |
| 2009/0239991 A1 | 9/2009 | Avtomonov et al. |

FOREIGN PATENT DOCUMENTS

| KR | 10-2007-0052820 A | 5/2007 |
| KR | 10-2008-0063229 A | 7/2008 |
| KR | 10-2010-0125344 A | 11/2010 |

* cited by examiner

*Primary Examiner* — Doris Lee
(74) *Attorney, Agent, or Firm* — Additon, Higgins & Pendleton, P.A.

(57) ABSTRACT

A flame retardant thermoplastic resin composition includes: (A) about 60% by weight (wt %) to about 90 wt % of a polycarbonate resin including a first polycarbonate having a weight average molecular weight from about 30,000 g/mol to about 50,000 g/mol and a second polycarbonate having a weight average molecular weight from about 5,000 g/mol to about 20,000 g/mol; (B) about 10 wt % to about 40 wt % of an aromatic vinyl resin having a fogging index (FI) of about 0.8 or less as calculated by Equation 1 defined in the specification; (C) about 1 part by weight to about 20 parts by weight of an impact modifier based on about 100 parts by weight of (A)+(B); and (D) about 5 parts by weight to about 30 parts by weight of a flame retardant based on about 100 parts by weight of (A)+(B.

12 Claims, No Drawings

FLAME RETARDANT THERMOPLASTIC RESIN COMPOSITION AND MOLDED ARTICLE PRODUCED FROM THE SAME

CROSS-REFERENCE TO RELATED APPLICATION

This application claims priority under 35 USC Section 119 to and the benefit of Korean Patent Application No. 10-2012-0157672, filed Dec. 28, 2012, the entire disclosure of which is incorporated herein by reference.

FIELD OF THE INVENTION

The present invention relates to a flame retardant thermoplastic resin composition and a molded article produced from the same.

BACKGROUND OF THE INVENTION

Polycarbonate (PC) compound materials are prepared by melt-mixing PC, which is widely used as an engineering plastic, with organic/inorganic materials, such as heat stabilizers, antioxidants, plasticizers, impact modifiers, flame retardants, inorganic fillers, and the like. Such PC compound materials exhibit superior properties to general resins such as polystyrene, polyethylene, polyvinyl chloride, polypropylene, and the like. In particular, since the PC compound materials allow easy adjustment of properties, such as impact resistance, flame retardancy, flowability and the like, the PC compound materials are applicable to various fields from electric/electronic products such as mobile phones, televisions, office machines and the like to industrial components and miscellaneous goods.

Recently, as plastic products have become lighter and thinner to achieve more eco-friendly designs, demand for novel PC compound materials simultaneously exhibiting various properties which are difficult to realize in existing PC compounds has increased.

Generally, PC compound materials can obtain suitable properties by adjusting a mixing ratio of organic/inorganic materials to be melt-mixed with PC. For example, Korean Patent Publication No. 10-2008-0063229A, No. 10-2010-0125344A, and the like disclose thermoplastic resin compositions prepared by melt-mixing PC with a cross-linkable rubber-modified impact modifier, a phosphorus flame retardant, and other additives. However, such thermoplastic resin compositions require an excessively large amount of the phosphorus flame retardant for realization of high flowability, thereby causing deterioration in heat resistance.

Korean Patent Publication No. 10-2007-0052820A discloses a resin composition having improved flowability through application of a PC oligomer. However, since such a PC oligomer has a relatively low weight average molecular weight ranging from 3,000 g/mol to 6,000 g/mol, the composition can suffer significant deterioration in impact resistance and elongation, despite improved flowability.

Thus, there is a need for a flame retardant thermoplastic resin composition that exhibits excellent properties in terms of impact resistance, oil resistance, flame retardancy and flowability, even when melt-mixed with flame retardants, impact modifiers, and the like.

SUMMARY OF THE INVENTION

The present invention provides a flame retardant thermoplastic resin composition, that can have an excellent balance of properties such as impact resistance, oil resistance, flame retardancy and/or flowability even when melt-mixed with flame retardants, impact modifiers and the like, and a molded article produced from the same.

The flame retardant thermoplastic resin composition includes: (A) about 60% by weight (wt %) to about 90 wt % of a polycarbonate resin including a first polycarbonate having a weight average molecular weight from about 30,000 g/mol to about 50,000 g/mol and a second polycarbonate having a weight average molecular weight from about 5,000 g/mol to about 20,000 g/mol; (B) about 10 wt % to about 40 wt % of an aromatic vinyl resin having a fogging index (FI) of about 0.8 or less as calculated by Equation 1; (C) about 1 part by weight to about 20 parts by weight of an impact modifier based on about 100 parts by weight of (A)+(B); and (D) about 5 parts by weight to about 30 parts by weight of a flame retardant based on about 100 parts by weight of (A)+(B):

$$\text{Fogging index (FI)} = W1/W0 \times 100, \qquad \text{[Equation 1]}$$

wherein $W1$ is a weight of unreacted monomers and oligomers deposited on a lid after placing about 10 g of an aromatic vinyl resin in a soda-lime petri dish having a diameter of about 55 mm, closing and sealing the lid, and reacting the aromatic vinyl resin at about 250° C. for about 20 minutes; and $W0$ is an initial weight of the aromatic vinyl resin.

In one embodiment, the first polycarbonate may be present in an amount of about 10 wt % to about 90 wt % in the (A) polycarbonate resin, and the second polycarbonate may be present in an amount of about 10 wt % to about 90 wt % in the (A) polycarbonate resin.

In one embodiment, the (B) aromatic vinyl resin may be a styrene-acrylonitrile copolymer.

In one embodiment, the (B) aromatic vinyl resin may have a weight average molecular weight from about 30,000 g/mol to about 200,000 g/mol.

In one embodiment, the (C) impact modifier may be a rubber-modified vinyl graft copolymer.

The (C) rubber-modified vinyl graft copolymer may have a structure in which an unsaturated monomer is grafted to a rubber core to form a shell. As used herein, the unsaturated monomer may include an aromatic vinyl monomer and at least one monomer copolymerizable with the aromatic vinyl monomer.

In one embodiment, the (D) flame retardant may be a phosphorus flame retardant.

In one embodiment, the (D) flame retardant may be a mixture of solid and liquid flame retardants.

In one embodiment, the flame retardant thermoplastic resin composition may further include (E) polyarylene ether.

The (E) polyarylene ether may be present in an amount of about 1 part by weight to about 15 parts by weight, based on about 100 parts by weight of (A)+(B).

In one embodiment, the flame retardant thermoplastic resin composition may have a flame retardancy level of V-0 or higher as measured on a specimen having a thickness of about 1.2 mm in accordance with the UL-94 vertical test method, an Izod impact strength from about 10 kgf·cm/cm to about 60 kgf·cm/cm as measured on an about ⅛" thick specimen in accordance with ASTM D256, and a melt flow index (MI) from about 10 g/10 min to about 50 g/10 min as measured at about 220° C. under a load of about 10 kg in accordance with ASTM D1238.

The present invention also relates to a molded article. The molded article is produced from the flame retardant thermoplastic resin composition.

DETAILED DESCRIPTION OF THE INVENTION

The present invention now will be described more fully hereinafter in the following detailed description of the invention, in which some, but not all embodiments of the invention are described. Indeed, this invention may be embodied in many different forms and should not be construed as limited to the embodiments set forth herein; rather, these embodiments are provided so that this disclosure will satisfy applicable legal requirements.

According to the present invention, a flame retardant thermoplastic resin composition includes: (A) a polycarbonate resin including a first polycarbonate having a weight average molecular weight from about 30,000 g/mol to about 50,000 g/mol and a second polycarbonate having a weight average molecular weight from about 5,000 g/mol to about 20,000 g/mol; (B) an aromatic vinyl resin having a fogging index (FI) of about 0.8 or less as calculated by Equation 1; (C) an impact modifier; and (D) a flame retardant:

$$\text{Fogging index (FI)} = W1/W0 \times 100, \quad \text{[Equation 1]}$$

wherein W1 is a weight of unreacted monomers and oligomers deposited on a lid after placing about 10 g of an aromatic vinyl resin in a soda-lime petri dish having a diameter of about 55 mm, closing and sealing the lid, and reacting the aromatic vinyl resin at about 250° C. for about 20 minutes therein; and W0 is an initial weight of the aromatic vinyl resin.

(A) Polycarbonate Resin

According to the invention, the (A) polycarbonate resin is a mixture of two types of polycarbonates having different weight average molecular weights and includes a first polycarbonate having a weight average molecular weight from about 30,000 g/mol to about 50,000 g/mol, for example, from about 30,000 g/mol to about 40,000 g/mol, and a second polycarbonate having a weight average molecular weight from about 5,000 g/mol to about 20,000 g/mol, for example, from about 10,000 g/mol to about 20,000 g/mol, as measured by gel permeation chromatography (GPC).

The first and second polycarbonates may be typical thermoplastic polycarbonate resins having each range of a weight average molecular weight, for example, an aromatic polycarbonate resin prepared by reacting one or more diphenols with phosgene, halogen formate, and/or carbonate diester.

Examples of the diphenols may include without limitation 4,4'-dihydroxydiphenyl, 2,2-bis-(4-hydroxyphenyl)-propane, 2,4-bis-(4-hydroxyphenyl)-2-methylbutane, 1,1-bis-(4-hydroxyphenyl)-cyclohexane, 2,2-bis-(3-chloro-4-hydroxyphenyl)-propane, 2,2-bis-(3,5-dichloro-4-hydroxyphenyl)-propane, and the like, and combinations thereof. For example, the diphenols may include 2,2-bis-(4-hydroxyphenyl)-propane, 2,2-bis-(3,5-dichloro-4-hydroxyphenyl)-propane and/or 1,1-bis-(4-hydroxyphenyl)-cyclohexane, for example, 2,2-bis-(4-hydroxyphenyl)-propane, which is referred to as bisphenol-A.

The first and second polycarbonates may be branched polycarbonates, and may be prepared, for example, by adding about 0.05 mol % to about 2 mol % of a tri- or more polyfunctional compound, for example, a compound having a 3- or higher valent phenol group, based on the total amount of the diphenols used for polymerization.

In one embodiment, the first polycarbonate is present in an amount of about 10 wt % to about 90 wt %, for example, about 20 wt % to about 80 wt %, and as another example about 40 wt % to about 60 wt %, based on the total weight (100 wt %) of the (A) polycarbonate resin, and the second polycarbonate is present in an amount of about 10 wt % to about 90 wt %, for example, about 20 wt % to about 80 wt %, and as another example about 40 wt % to about 60 wt %, based on the total weight (100 wt %) of the (A) polycarbonate resin.

In some embodiments, the mixture of the first and second polycarbonate may include the first polycarbonate in an amount of about 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, or 90 wt %. Further, according to some embodiments of the present invention, the amount of the first polycarbonate can be in a range from about any of the foregoing amounts to about any other of the foregoing amounts.

In some embodiments, the mixture of the first and second polycarbonate may include the second polycarbonate in an amount of about 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, or 90 wt %. Further, according to some embodiments of the present invention, the amount of the second polycarbonate can be in a range from about any of the foregoing amounts to about any other of the foregoing amounts.

Within these ranges, the resin composition can have an excellent balance of impact resistance, oil resistance, flame retardancy, and/or flowability.

According to the invention, the (A) polycarbonate resin may be present in an amount of about 60 wt % to about 90 wt %, for example, about 65 wt % to about 85 wt %, and as another example about 70 wt % to about 80 wt %, based on the total weight (100 wt %) of the (A)+(B) base resin. In some embodiments, the (A) polycarbonate resin may be present in an amount of about 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, or 90 wt %. Further, according to some embodiments of the present invention, the amount of the (A) polycarbonate resin can be in a range from about any of the foregoing amounts to about any other of the foregoing amounts.

If the amount of the (A) polycarbonate resin is less than about 60 wt %, the resin composition can exhibit deteriorated impact resistance, flame retardancy and the like, which can deteriorate the balance of impact resistance, oil resistance, flame retardancy and flowability. If the amount of the (A) polycarbonate resin exceeds about 90 wt %, the resin composition can exhibit deteriorated flowability, which can deteriorate the balance of impact resistance, oil resistance, flame retardancy and flowability.

(B) Aromatic Vinyl Resin

According to the invention, the (B) aromatic vinyl resin is a copolymer of an aromatic vinyl monomer and a monomer copolymerizable with the aromatic vinyl monomer, and has a fogging index (FI) of about 0.8 or less, for example, about 0 to about 0.6, as calculated by Equation 1. If the fogging index (FI) exceeds about 0.8, there is a concern of deterioration in terms of impact resistance of the resin composition.

According to the invention, the fogging index (FI) can be determined as follows. After placing a small amount of the (B) aromatic vinyl resin in a soda-lime petri dish having a diameter of about 55 mm, closing and sealing a lid, and reacting the (B) aromatic vinyl resin at about 250° C. for about 20 minutes therein, the fogging index (FI) is calculated as an amount of unreacted monomers and oligomers per unit weight (10 g) of the (B) aromatic vinyl resin by measuring a weight of organic materials (unreacted monomers and oligomers, fogging) deposited on the lid of the petri dish, and dividing the measured value by a weight of the (B) weighed aromatic vinyl resin.

The term oligomers may refer to compounds having a weight average molecular weight of about 6,000 g/mol or less as measured by gel permeation chromatography (GPC).

Examples of the aromatic vinyl monomer include without limitation styrene, α-methylstyrene, β-methylstyrene, p-methylstyrene, para-t-butylstyrene, ethylstyrene, and the like. These may be used alone or in combination thereof.

Examples of the monomer copolymerizable with the aromatic vinyl monomer include without limitation vinyl cyanide compounds, $C_1$ to $C_{12}$ alkyl (meth)acrylates, (meth) acrylates, acid anhydrides, $C_1$ to $C_{12}$ alkyl and/or phenyl nucleus-substituted maleimides, and the like. These may be used alone or in combination thereof.

In one embodiment, the (B) aromatic vinyl resin may be a styrene-acrylonitrile copolymer (SAN) obtained by copolymerizing a styrene monomer with an acrylonitrile monomer.

The (B) aromatic vinyl resin may include the aromatic vinyl monomer in an amount of about 50 wt % to about 95 wt %, for example, about 60 wt % to about 90 wt %, and as another example about 70 wt % to about 80 wt %, based on the total weight (100 wt %) of the (B) aromatic vinyl resin (the total weight of the aromatic vinyl monomer and the monomer copolymerizable with the aromatic vinyl monomer). In some embodiments, the (B) aromatic vinyl resin may include the aromatic vinyl monomer in an amount of about 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, or 95 wt %. Further, according to some embodiments of the present invention, the amount of the aromatic vinyl monomer can be in a range from about any of the foregoing amounts to about any other of the foregoing amounts.

Within this range, the resin composition can obtain an excellent balance of impact resistance and mechanical properties.

The monomer copolymerizable with the aromatic vinyl monomer may be present in an amount of about 5 wt % to about 50 wt %, for example, about 10 wt % to about 40 wt %, and as another example about 20 wt % to about 30 wt %, based on the total weight (100 wt %) of the (B) aromatic vinyl resin. In some embodiments, the (B) aromatic vinyl resin may include may include the monomer copolymerizable with the aromatic vinyl monomer in an amount of about 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50 wt %. Further, according to some embodiments of the present invention, the amount of the monomer copolymerizable with the aromatic vinyl monomer can be in a range from about any of the foregoing amounts to about any other of the foregoing amounts.

Within this range, the resin composition can obtain an excellent balance of impact resistance and mechanical properties.

In one embodiment, the (B) aromatic vinyl resin may be prepared, for example, through free radical suspension polymerization by mixing: a monomer mixture of about 75 parts by weight of styrene and about 25 parts by weight of acrylonitrile; additives such as about 0.5 parts by weight of 1,1-di(tert-butylperoxy)cyclohexane, about 0.3 parts by weight of polyoxyethylene alkyl ether phosphate, and about 0.5 parts by weight of tricalcium phosphate based on about 100 parts by weight of the monomer mixture; and about 90 parts by weight of water based on about 100 parts by weight of the monomer mixture in an about 100 L batch reactor. In addition, in order to reduce amounts of unreacted monomers and oligomers of the prepared polymer as described above, the polymer may be used after being left at about 120° C. for about 2 hours in a heater connected to the batch reactor in series for a steam heating recovery process, followed by dehydration, and drying.

The (B) aromatic vinyl resin may have a weight average molecular weight from about 30,000 g/mol to about 200,000 g/mol, for example, from about 60,000 g/mol to about 200,000 g/mol, as measured by gel permeation chromatography (GPC). Within this range, the resin composition can exhibit excellent properties of flowability and impact resistance.

According to the invention, the (B) aromatic vinyl resin may be present in an amount of about 10 wt % to about 40 wt %, for example, about 15 wt % to about 35 wt %, and as another example about 20 wt % to about 30 wt %, based on the total weight (100 wt %) of the (A)+(B) base resin. In some embodiments, the (B) aromatic vinyl resin may be present in an amount of about 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, or 40 wt %. Further, according to some embodiments of the present invention, the amount of the (B) aromatic vinyl resin can be in a range from about any of the foregoing amounts to about any other of the foregoing amounts.

If the amount of the (B) aromatic vinyl resin is less than about 10 wt %, flowability of the resin composition can be deteriorated, which can deteriorate the balance of impact resistance, oil resistance, flame retardancy and flowability. In addition, if the amount of the (B) aromatic vinyl resin exceeds about 90 wt %, impact resistance of the resin composition can be deteriorated, which can deteriorate the balance of impact resistance, oil resistance, flame retardancy and flowability.

(C) Impact Modifier

According to the invention, the (C) impact modifier may be a typical impact modifier used in flame retardant thermoplastic resins, for example, a rubber-modified vinyl graft copolymer. The rubber-modified vinyl graft copolymer may have a core-shell graft copolymer structure in which a shell is formed by grafting an unsaturated monomer to a core structure of rubber.

Examples of the rubber may include without limitation $C_4$ to $C_6$ diene rubbers, acrylate rubbers, silicone rubbers, and the like, and combinations thereof. In exemplary embodiments, the rubber may include a silicone rubber and/or an acrylate rubber in terms of structural stability.

The acrylate rubber may include one or more (meth)acrylate monomers, such as but not limited to methyl (meth) acrylate, ethyl (meth)acrylate, n-propyl (meth)acrylate, n-butyl (meth)acrylate, 2-ethylhexyl (meth)acrylate, hexyl (meth) acrylate, and the like, and combinations thereof. In the preparation of the acrylate rubber, a curing agent, such as ethylene glycol di(meth)acrylate, propylene glycol di(meth) acrylate, 1,3-butylene glycol di(meth)acrylate, 1,4-butylene glycol di(meth)acrylate, allyl (meth)acrylate, triallyl cyanurate, and the like, and combinations thereof, may be used.

The silicone rubber may be prepared from cyclosiloxane. Examples of the cyclosiloxane include without limitation hexamethyl cyclotrisiloxane, octamethyl cyclotetrasiloxane, decamethyl cyclopentasiloxane, dodecamethyl cyclohexasiloxane, trimethyl triphenyl cyclotrisiloxane, tetramethyl tetraphenyl cyclotetrasiloxane, octaphenyl cyclotetrasiloxane, and the like, and mixtures thereof. In the preparation of the silicone rubber, a curing agent, such as trimethoxymethylsilane, triethoxyphenylsilane, tetramethoxysilane, tetraethoxysilane, and the like, and combinations thereof, may be used.

The (C) rubber-modified vinyl graft copolymer may include the rubber in an amount of about 30 parts by weight to about 95 parts by weight, for example, about 40 parts by weight to about 90 parts by weight, and in another example about 60 parts by weight to about 85 parts by weight, based on about 100 parts by weight of the rubber-modified vinyl graft copolymer. In some embodiments, the (C) rubber-modified vinyl graft copolymer may include the rubber in an amount of about 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, or 95 parts by weight. Further, according to some embodiments of the present invention, the amount of the rubber can be in a range from about any of the foregoing amounts to about any other of the foregoing amounts.

Within this range, the rubber-modified vinyl graft copolymer can exhibit excellent compatibility with resins and, as a result, the resin composition can exhibit improved impact resistance.

The rubber may have an average particle diameter from about 0.1 μm to about 1 μm, for example, from about 0.4 μm to about 0.9 μm. Within this range, the resin composition can exhibit excellent impact resistance.

The unsaturated monomer grafted to the rubber may be at least one or more of the aromatic vinyl monomers used in the (B) aromatic vinyl resin, the monomers copolymerizable with the aromatic vinyl monomer, and the like, and combinations thereof.

Examples of the aromatic vinyl monomer include without limitation styrene, α-methylstyrene, β-methylstyrene, p-methylstyrene, para-t-butylstyrene, ethylstyrene, and the like. These may be used alone or in combination thereof.

Examples of the monomer copolymerizable with the aromatic vinyl monomer include without limitation vinyl cyanide compounds, $C_1$ to $C_{12}$ alkyl (meth)acrylates, (meth)acrylates, acid anhydrides, $C_1$ to $C_{12}$ alkyl and/or phenyl nucleus-substituted maleimides, and the like. These may be used alone or in combination thereof. As used herein, examples of the vinyl cyanide compounds include without limitation acrylonitrile, methacrylonitrile and the like, and examples of the alkyl (meth)acrylates include without limitation methyl methacrylate, ethyl methacrylate, propyl methacrylate, and the like. In addition, examples of the acid anhydride may include without limitation carboxylic acid anhydrides, such as maleic anhydride, itaconic anhydride, and the like. In exemplary embodiments, the monomer copolymerizable with the aromatic vinyl monomer can include methyl methacrylate.

The rubber-modified vinyl graft copolymer may include the grafted unsaturated monomer in an amount of about 5 parts by weight to about 50 parts by weight, for example, about 10 parts by weight to about 40 parts by weight, and as another example about 15 parts by weight to about 30 parts by weight, based on about 100 parts by weight of the (C) rubber-modified vinyl graft copolymer. In some embodiments, the rubber-modified vinyl graft copolymer may include the grafted unsaturated monomer in an amount of about 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 30, 31, 32, 33, 34, 35, 36, 37, 38, 39, 40, 41, 42, 43, 44, 45, 46, 47, 48, 49, or 50 parts by weight. Further, according to some embodiments of the present invention, the amount of the grafted unsaturated monomer can be in a range from about any of the foregoing amounts to about any other of the foregoing amounts.

Within this range, the rubber-modified vinyl graft copolymer can exhibit excellent compatibility with the resins, and the resin composition can exhibit improved impact resistance.

According to the invention, the thermoplastic resin composition can include the (C) impact modifier in an amount of about 1 part by weight to about 20 parts by weight, for example, about 5 parts by weight to about 15 parts by weight, based on about 100 parts by weight of (A)+(B). In some embodiments, the thermoplastic resin composition can include the (C) impact modifier in an amount of about 1, 2, 3, 4, 5, 6, 7, 8, 9, 10, 11, 12, 13, 14, 15, 16, 17, 18, 19, or 20 parts by weight. Further, according to some embodiments of the present invention, the amount of the (C) impact modifier can be in a range from about any of the foregoing amounts to about any other of the foregoing amounts.

If the amount of the (C) impact modifier is less than about 1 part by weight, the resin composition can exhibit insufficient impact resistance. If the amount of the (C) impact modifier exceeds about 20 parts by weight, the resin composition can have deteriorated balance among impact resistance, oil resistance, flame retardancy, and flowability.

(D) Flame Retardant

According to the invention, the (D) flame retardant may be a typical flame retardant used in thermoplastic resin compositions, for example, phosphorus flame retardants such as phosphate ester compounds, polyphosphate compounds, red phosphorus compounds and the like, halogen flame retardants, and mixtures thereof. In exemplary embodiments, the (D) flame retardant may include eco-friendly phosphorus flame-retardants, more specifically, phosphate ester compounds. Examples of the phosphate ester compounds include without limitation diphenylphosphate, triphenylphosphate, tricresylphosphate, trixylenylphosphate, tri(2,6-dimethylphenyl)phosphate, tri(2,4,6-trimethylphenyl)phosphate, tri(2,4-ditert-butylphenyl)phosphate, tri(2,6-dimethylphenyl)phosphate, resorcinol bis(diphenyl)phosphate, resorcinol bis(2,6-dimethylphenyl)phosphate, resorcinol bis(2,4-ditert-butylphenyl)phosphate, hydroquinone bis(2,6-dimethylphenyl)phosphate, hydroquinone bis(2,4-ditert-butylphenyl)phosphate, and the like, without being limited thereto. The phosphate ester compounds may be used alone or in combination thereof.

In one embodiment, the (D) flame retardant may be a mixture of solid and liquid flame retardants. As used herein, the "liquid flame retardant" includes all liquid flame-retardants and flame-retardants dissolved in water or an organic solvent. The organic solvent for dissolving the (D) flame retardant may be any typical organic solvent capable of dissolving flame-retardants without limitation. Examples of the organic solvent include without limitation hexane, benzene, toluene, xylene, diethyl ether, chloroform, ethyl acetate, dioxane, tetrahydrofuran (THF), dichloromethane (DCM), acetone, acetonitrile, dimethyl formamide (DMF), dimethyl sulfoxide (DMSO), acetic acids, N-butanol, isopropanol (IPA), N-propanol, ethanol, methanol, and the like, and combinations thereof.

In one embodiment, when the (D) flame retardant is a mixture of solid and liquid flame retardants, a weight ratio of the solid flame retardant to the liquid flame retardant (solid:liquid) may range from about 1:about 99 to about 20:about 80, for example, from about 5:about 95 to about 15:about 85. Within this range, the resin composition can exhibit excellent flame retardancy.

In some embodiments, the mixture of solid and liquid flame retardants can include the solid flame retardant in an amount of about 1, 2, 3, 4, 5, 6, 7, 8, 9, 10, 11, 12, 13, 14, 15, 16, 17, 18, 19, or 20 wt %, based on the total weight of the mixture. Further, according to some embodiments of the present invention, the amount of the solid flame retardant can be in a range from about any of the foregoing amounts to about any other of the foregoing amounts.

In some embodiments, the mixture of solid and liquid flame retardants can include the liquid flame retardant in an amount of about 80, 81, 82, 83, 84, 85, 86, 87, 88, 89, 90, 91, 92, 93, 94, 95, 96, 97, 98, or 99 wt %, based on the total weight of the mixture. Further, according to some embodiments of the present invention, the amount of the liquid flame retardant can be in a range from about any of the foregoing amounts to about any other of the foregoing amounts.

According to the invention, the thermoplastic resin composition may include the (D) flame retardant in an amount of about 5 parts by weight to about 30 parts by weight, for example, about 10 parts by weight to about 25 parts by weight, based on about 100 parts by weight of (A)+(B). In some embodiments, the thermoplastic resin composition can include the (D) flame retardant in an amount of about 5, 6, 7, 8, 9, 10, 11, 12, 13, 14, 15, 16, 17, 18, 19, 20, 21, 22, 23, 24, 25, 26, 27, 28, 29, or 30 parts by weight. Further, according to some embodiments of the present invention, the amount of the (D) flame retardant can be in a range from about any of the foregoing amounts to about any other of the foregoing amounts.

If the amount of the (D) flame retardant is less than about 5 parts by weight, flame retardancy of the resin composition can deteriorate. If the amount of the (D) flame retardant exceeds about 30 parts by weight, the resin composition can have a deteriorated balance of impact resistance, oil resistance, flame retardancy, and flowability.

According to the invention, the flame retardant thermoplastic resin composition may further include (E) polyarylene ether for reinforcement of flame retardancy and heat resistance. Generally, since polycarbonate resins do not mix well with polyarylene ether, the resin composition can exhibit deteriorated properties when polycarbonate resins and polyarylene ether are used in conjunction. However, according to the invention, since the flame retardant thermoplastic resin composition includes the (B) aromatic vinyl resin having a limited fogging index (FI), the resin composition can have reinforced flame retardancy and heat resistance without deterioration of other properties even when mixed with polyarylene ether.

(E) Polyarylene Ether

According to the invention, the (E) polyarylene ether may be, for example, a polymer including a unit represented by Formula 1:

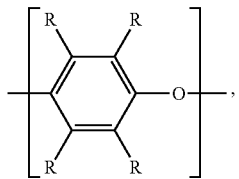

[Formula 1]

wherein each R is independently hydrogen, halogen, $C_1$ to $C_6$ alkyl, or $C_6$ to $C_{12}$ aryl.

Examples of the (E) polyarylene ether include without limitation polyphenylene ether, poly(2,6-dimethyl-1,4-phenylene)ether, poly(2,6-diethyl-1,4-phenylene)ether, poly(2,6-dipropyl-1,4-phenylene)ether, poly(2-methyl-6-ethyl-1,4-phenylene)ether, poly(2-methyl-6-propyl-1,4-phenylene)ether, poly(2-ethyl-6-propyl-1,4-phenylene)ether, poly(2,6-diphenyl-1,4-phenylene)ether, copolymers of poly(2,6-dimethyl-1,4-phenylene)ether and poly(2,3,6-trimethyl-1,4-phenylene)ether, copolymers of poly(2,6-dimethyl-1,4-phenylene)ether and poly(2,3,5-triethyl-1,4-phenylene)ether, and the like, and combinations thereof.

The (E) polyarylene ether may be a commercially available one, for example, polyarylene ether prepared by reaction of a monohydroxy aromatic compound at about 10° C. to about 50° C. in the presence of a solvent, an organic solvent, a catalyst and oxygen. As used herein, the solvent may be anisole, and the organic solvent may be $C_1$ to $C_6$ alkyl alcohol or a mixture thereof. In addition, the catalyst may be a catalyst including copper salts and/or amine compounds.

The (E) polyarylene ether may have a weight average molecular weight from about 15,000 g/mol to about 35,000 g/mol, for example, from about 20,000 g/mol to about 30,000 g/mol, as measured by gel permeation chromatography (GPC), without being limited thereto.

In use, the thermoplastic resin composition may include the (E) polyarylene ether in an amount of about 1 part by weight to about 15 parts by weight, for example, about 1 part by weight to about 10 parts by weight, based on about 100 parts by weight of (A)+(B). In some embodiments, the thermoplastic resin composition can include the (E) polyarylene ether in an amount of about 1, 2, 3, 4, 5, 6, 7, 8, 9, 10, 11, 12, 13, 14, or 15 parts by weight. Further, according to some embodiments of the present invention, the amount of the (E) polyarylene ether can be in a range from about any of the foregoing amounts to about any other of the foregoing amounts.

Within this range, the resin composition can have improved flame retardancy and heat resistance without deterioration of other properties.

According to the invention, the flame retardant thermoplastic resin composition may further include one or more additives. Examples of the additives can include without limitation flame retardant aids, lubricants, surfactants, nucleating agents, coupling agents, fillers, plasticizers, antimicrobial agents, release agents, heat stabilizers, antioxidants, light stabilizers, compatibilizers, inorganic additives, antistatic agents, pigments, dyes, and the like, as needed. These additives may be used alone or in combination thereof. Although these additives may be included in the resin composition through addition using a typical pelletization process (extrusion process) of the thermoplastic resin composition, the method for addition is not particularly limited. The additives may be present in an amount of about 0.001 parts by weight to about 20 parts by weight, based on about 100 parts by weight of (A)+(B), without being limited thereto.

According to the invention, the flame retardant thermoplastic resin composition may have a flame retardancy level of V-0 or higher, as measured on an about 1.2 mm thick specimen in accordance with the UL-94 vertical test method, and an Izod impact strength from about 10 kgf·cm/cm to about 60 kgf·cm/cm, for example, from about 30 kgf·cm/cm to about 50 kgf·cm/cm, as measured on an about ⅛" thick specimen in accordance with ASTM D256. In addition, the flame retardant thermoplastic resin composition may have a melt flow index (MI) from about 10 g/10 min to about 50 g/10 min, for example, from about 20 g/10 min to about 40 g/10 min, and as another example from about 25 g/10 min to about 40 g/10 min, as measured at about 220° C. under a load of about 10 kg in accordance with ASTM D1238. Further, the flame retardant thermoplastic resin composition may have a spiral flow of about 45 cm or more, for example, about 48 cm to about 60 cm, as evaluated by measuring a length (unit: cm) of an injection-molded specimen after flame retardant thermoplastic resin pellets are injection-molded at about 250° C. in an injection molding machine using a spiral mold having a width of about 10 mm and a thickness of about 2 mm.

According to embodiments of the present invention, a molded article is produced from the flame retardant thermoplastic resin composition. The flame retardant thermoplastic resin composition may be prepared in pellet form by melt extrusion of a mixture in an extruder after mixing all of the above components and other optional additives. The pelletized resin composition may be used to produce various molded articles through various molding processes, such as injection molding, extrusion, vacuum molding, cast molding, and the like. These methods are known to those skilled in the art.

The molded article can have excellent properties in terms of impact resistance, oil resistance, flame retardancy, flowability, heat resistance, and the like. Accordingly, the molded article may be widely applied to components of electric and electronic products, exterior materials, automobile parts, miscellaneous goods, structural materials, and the like.

Next, the present invention will be explained in more detail with reference to the following examples. However, it should be understood that these examples are provided for illustration only and are not to be in any way construed as limiting the present invention.

EXAMPLES

Details of components used in Examples and Comparative Examples are as follows:

(A) Polycarbonate resin (A-1) A polycarbonate resin (CALIBRE 200-3, LG-DOW Co., Ltd.) having a weight average molecular weight (Mw) of 37,000 g/mol is used.

(A-2) A polycarbonate resin (FX-8500, Cheil Industries Inc.) having a weight average molecular weight (Mw) of 16,000 g/mol is used.

(B) Aromatic vinyl resin (B-1) A mixture of 75 parts by weight of styrene and 25 parts by weight of acrylonitrile, based on 100 parts by weight of the mixture, 0.5 parts by weight of 1,1-di(tert-butylperoxy) cyclohexane, 0.003 parts by weight of polyoxyethylene alkylether phosphate, 0.5 parts by weight of tricalcium phosphate and 90 parts by weight of water are mixed in a reactor, and an aromatic vinyl resin is prepared through free radical suspension polymerization.

The prepared polymer is used after being left at 120° C. for 2 hours in a heater connected to the reactor in series for a steam heating recovery process in order to reduce amounts of unreacted monomers and oligomers, followed by dehydration and drying (weight average molecular weight: 95,000 g/mol, PDI: 1.8, fogging index (FI): 0.5 or less).

(B-2) A styrene-acrylonitrile copolymer (HF-5670, Cheil Industries Inc., weight average molecular weight: 95,000 g/mol, PDI: 2.0) having a fogging index (FI) of 1.5 is used.

(C) Impact modifier

A rubber-modified vinyl graft copolymer (METABLEN S-2001, Mitsubishi Rayon Co., Ltd., Japan) is used.

(D) Flame retardant (D-1) Aromatic polyphosphate (CR-741, Daihachi Co., Ltd.) is used as a liquid flame retardant.

(D-2) Diaryl phosphate (PX-200, Daihachi Co., Ltd.) is used as a solid flame retardant.

(E) Polyarylene ether

Polyarylene ether (LXR-035C, Bluestar New Chemical Materials Co., Ltd.) is used.

The weight average molecular weight of each component is measured via gel permeation chromatography (GPC) under the following conditions:

Detector: Differential refractive index detector RI (8020 type, sensitivity: 32, Dosso Co., Ltd.);

UV absorption detector UV (2487, wavelength: 215 nm, sensitivity: 0.2 AUFS, Waters Co., Ltd.);

Column: TSKgel GMHXL 2ea and G2500HXL 1ea (S/N M0052, M0051, N0010, ⌀ 7.8 mm×30 cm, Dosso Co., Ltd.), Column temperature: 35° C.;

Solvent: Tetrahydrofuran,

Flow rate: 1.0 mL/min;

Sample: [Concentration] about 0.2%, [Filtration] 0.45 μm filter,

Injection amount: 0.200 mL;

Standard sample: Monodispersed polystyrene.

Examples 1 to 5 and Comparative Examples 1 to 5

According to amounts as listed in Table 1, the above components, 1.2 parts by weight of a flame retardant (FR2025, 3M Co., Ltd.), 0.28 parts by weight of an antioxidant (Songnox 1076, Songwon Industrial Co., Ltd.) and 0.18 parts by weight of a lubricant (WAX-S, Kyungil Co., Ltd.) based on 100 parts by weight of (A)+(B) are introduced into a twin-screw extruder, followed by extrusion at 250° C., thereby preparing a pelletized flame retardant resin composition. After the prepared pellets are dried at 80° C. for 5 hours or more, specimens for property evaluation are prepared using a screw-type injection molding machine (LGH 140N) heated to 250° C. The prepared specimens are evaluated as to the following properties by the following methods. Results are shown in Table 2.

TABLE 1

|  | Example | | | | | Comparative Example | | | | |
| --- | --- | --- | --- | --- | --- | --- | --- | --- | --- | --- |
|  | 1 | 2 | 3 | 4 | 5 | 1 | 2 | 3 | 4 | 5 |
| A-1 (wt %) | 44 | 44 | 44 | 44 | 44 | 44 | 26 | 49 | 80 | — |
| A-2 (wt %) | 36 | 36 | 36 | 36 | 36 | 36 | 24 | 46 | — | 80 |
| B-1 (wt %) | 20 | 17 | 16 | 20 | 20 | — | 50 | 5 | 20 | 20 |
| B-2 (wt %) | — | 3 | 4 | — | — | 20 | — | — | — | — |
| FI | 0.5 | 0.65 | 0.7 | 0.5 | 0.5 | 1.5 | 0.5 | 0.5 | 0.5 | 0.5 |
| C (parts by weight) | 8.7 | 8.7 | 8.7 | 8.7 | 8.7 | 8.7 | 8.7 | 8.7 | 8.7 | 8.7 |
| D-1 (parts by weight) | 21 | 21 | 21 | 21 | 21 | 21 | 21 | 21 | 21 | 21 |
| D-2 (parts by weight) | 1 | 1 | 1 | 1 | 1 | 1 | 1 | 1 | 1 | 1 |
| E (parts by weight) | — | — | — | 2 | 8 | — | — | — | — | — |

Parts by weight based on 100 parts by weight of (A) + (B)

Property Evaluation (1) Izod impact strength: Izod impact strength is measured on ⅛" thick and ¼" thick notched Izod specimens in accordance with ASTM D256 (unit: kgf·cm/cm).

(2) Melt flow index (MI): Melt flow index is measured at 250° C. under a load of 2.16 kg in accordance with ASTM D1238 (unit: g/10 min).

(3) Ball-drop test: After a specimen having a size of 70 mm×50 mm×0.8 mm (width×length×height) is injection-molded, a rectangular hole having a size of 10 mm×10 mm is drilled at the center of the specimen. Next, with the specimen placed on a frame, which is prepared such that the specimen could be separated from the ground by 25 mm and a rim of the specimen straddled the frame by 5 mm to 10 mm, a spherical ball having a weight of 500 g and a diameter of 50 mm is dropped onto the specimen from a height of 1.3 m. The number of cracked vertices of the rectangular hole is measured.

(4) Oil resistance: In accordance with the ESCR test method (refer to the Journal of the Society of Petroleum Engineers (p 667~670), June, 1962), after a tension specimen for ASTM D638 testing is secured to a jig, mineral oil (S-304, Sugimura Chemical Industrial Co., Ltd.) is coated onto the specimen. A time point at which cracking occurred is checked.

(5) Spiral flow test: After flame retardant thermoplastic resin pellets of Examples and Comparative Examples are injection-molded at 250° C. in the injection molding machine (LGH 140N) using a spiral mold having a width of 10 mm and a thickness of 2 mm, the length of each injection-molded specimen is measured (unit: cm).

(6) Flame retardancy: Flame retardancy is measured on 1.2 mm thick and 1.5 mm thick specimens in accordance with the UL-94 vertical test method.

(7) Heat resistance (Heat deflection temperature: HDT): Heat resistance is measured in accordance with ASTM D648 (unit: ° C.).

TABLE 2

| | | Example | | | | | Comparative Example | | | | |
|---|---|---|---|---|---|---|---|---|---|---|---|
| | | 1 | 2 | 3 | 4 | 5 | 1 | 2 | 3 | 4 | 5 |
| Izod | ⅛" | 45 | 41 | 39 | 44 | 42 | 29 | 11 | 51 | 47 | 35 |
| | ¼" | 19 | 17 | 16 | 19 | 18 | 12 | 8 | 23 | 20 | 14 |
| MI | | 31 | 33 | 34 | 29 | 28 | 35 | 44 | 23 | 21 | 39 |
| Ball-drop test (total number of cracks) | | 0 | 0 | 0 | 0 | 0 | 4 | 4 | 0 | 0 | 3 |
| Oil resistance (Day of crack generation) | | 10 | 9 | 9 | 10 | 9 | 4 | 1 | 10 | 10 | 1 |
| Spiral flow (cm) | | 54 | 54 | 54 | 54 | 52 | 55 | 62 | 41 | 40 | 59 |
| Flame | 1.2 mm | V0 | V0 | V0 | V0 | V0 | V0 | Fail | V0 | V0 | V0 |
| retardancy | 1.5 mm | 5VB | 5VB | 5VB | 5VB | 5VB | Fail | Fail | 5VB | 5VB | 5VB |
| HDT (° C.) | | 80 | 80 | 80 | 81 | 83 | 80 | 73 | 86 | 80 | 81 |

As can be seen from the results shown in Table 2, the flame retardant thermoplastic resin compositions according to the invention (Examples 1 to 5) have an excellent balance of properties such as impact resistance, oil resistance, flame retardancy and flowability even when used with flame retardants, impact modifiers and the like. Conversely, the flame retardant thermoplastic resin compositions of the Comparative Examples exhibit poor impact resistance, flowability and the like, and thus have a deteriorated balance of properties, as compared with the compositions according to the invention.

Many modifications and other embodiments of the invention will come to mind to one skilled in the art to which this invention pertains having the benefit of the teachings presented in the foregoing description. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation, the scope of the invention being defined in the claims.

What is claimed is:

1. A flame retardant thermoplastic resin composition comprising:
    (A) about 60 wt % to about 90 wt % of a polycarbonate resin comprising a first polycarbonate having a weight average molecular weight from about 30,000 g/mol to about 50,000 g/mol and a second polycarbonate having a weight average molecular weight from about 5,000 g/mol to about 20,000 g/mol;
    (B) about 10 wt % to about 40 wt % of an aromatic vinyl resin having a fogging index (FI) of about 0.8 or less as calculated by Equation 1;
    (C) about 1 part by weight to about 20 parts by weight of an impact modifier based on about 100 parts by weight of (A)+(B); and
    (D) about 5 parts by weight to about 30 parts by weight of a flame retardant based on about 100 parts by weight of (A)+(B):

$$\text{Fogging index (FI)} = W1/W0 \times 100 \quad \text{[Equation 1]}$$

wherein W1 is a weight of unreacted monomers and oligomers deposited on a lid after placing about 10 g of an aromatic vinyl resin in a soda-lime petri dish having a diameter of about 55 mm, closing and sealing the lid, and reacting the aromatic vinyl resin at 250° C. for 20 minutes therein; and W0 is an initial weight of the aromatic vinyl resin.

2. The flame retardant thermoplastic resin composition according to claim 1, wherein the polycarbonate resin (A) includes the first polycarbonate in an amount of about 10 wt % to about 90 wt % and the second polycarbonate in an amount of about 10 wt % to about 90 wt %.

3. The flame retardant thermoplastic resin composition according to claim 1, wherein the (B) aromatic vinyl resin is a styrene-acrylonitrile copolymer.

4. The flame retardant thermoplastic resin composition according to claim 1, wherein the (B) aromatic vinyl resin has a weight average molecular weight from about 30,000 g/mol to about 200,000 g/mol.

5. The flame retardant thermoplastic resin composition according to claim 1, wherein the (D) flame retardant is a phosphorus flame retardant.

6. The flame retardant thermoplastic resin composition according to claim 1, wherein the (D) flame retardant is a mixture of solid and liquid flame retardants.

7. The flame retardant thermoplastic resin composition according to claim 1, wherein the flame retardant thermoplastic resin composition has a flame retardancy level of V-0 or higher as measured on an about 1.2 mm thick specimen in accordance with the UL-94 vertical test method, an Izod impact strength from about 10 kgf·cm/cm to about 60 kgf·cm/cm as measured on an about ⅛" thick specimen in accordance with ASTM D256, and a melt flow index (MI) from about 10 g/10 min to about 50 g/10 min as measured at about 220° C. under a load of about 10 kg in accordance with ASTM D1238.

8. The flame retardant thermoplastic resin composition according to claim 1, wherein the (C) impact modifier is a rubber-modified vinyl graft copolymer.

9. The flame retardant thermoplastic resin composition according to claim 8, wherein the (C) rubber-modified vinyl graft copolymer has a structure in which an unsaturated monomer is grafted to a rubber core to form a shell, and the unsaturated monomer comprising an aromatic vinyl monomer and at least one monomer copolymerizable with the aromatic vinyl monomer.

10. The flame retardant thermoplastic resin composition according to claim 1, further comprising (E) polyarylene ether.

11. The flame retardant thermoplastic resin composition according to claim 10, comprising the (E) polyarylene ether in an amount of about 1 part by weight to about 15 parts by weight, based on about 100 parts by weight of (A)+(B).

12. A molded article produced from the flame retardant thermoplastic resin composition according to claim 1.

* * * * *